United States Patent
Kuenzler

[15] 3,690,147
[45] Sept. 12, 1972

[54] TORSIONAL VIBRATION DENSITOMETER

[72] Inventor: Howard W. Kuenzler, South Acton, Mass.

[73] Assignee: Massachusetts Institute of Technology, Cambridge, Mass.

[22] Filed: Aug. 15, 1969

[21] Appl. No.: 850,534

[52] U.S. Cl. .......................... 73/32, 73/30, 73/194 B
[51] Int. Cl. .............................................. G01n 9/00
[58] Field of Search .......... 73/32, 30, 67.1, 71.6, 194

[56] References Cited

UNITED STATES PATENTS

| | | | |
|---|---|---|---|
| 2,889,702 | 6/1959 | Brooking | 73/32 |
| 3,444,723 | 5/1969 | Wakefield | 73/32 |
| 3,516,283 | 6/1970 | Abbotts | 73/32 X |

FOREIGN PATENTS OR APPLICATIONS

| | | | |
|---|---|---|---|
| 731,374 | 4/1966 | Canada | 73/32 |

Primary Examiner—Richard C. Queisser
Assistant Examiner—C. E. Snee, III
Attorney—Thomas Cooch and Martin M. Santa

[57] ABSTRACT

A direct measurement of density of a fluid is made by coupling the fluid to a rod under torsional oscillation. The frequency of torsional oscillation is maintained at the resonant frequency by sensing the phase difference between the stress in the rod and the current in a driving coil which produces the force to sustain torsional oscillation in the rod. The stress is measured by strain gauges which provide the electrical signal for phase comparison with the driving coil current. The frequency of the current is controlled by a voltage controlled oscillator whose input is derived from the phase comparison to provide a frequency which is at the resonant frequency of the oscillatory rod as modified by the density of the fluid to which it is coupled. The precise relationship between fluid density and resonant frequency is established by calibration.

9 Claims, 10 Drawing Figures

INVENTOR:
HOWARD W. KUENZLER
BY
ATTORNEY

INVENTOR:
HOWARD W. KUENZLER

BY
ATTORNEY

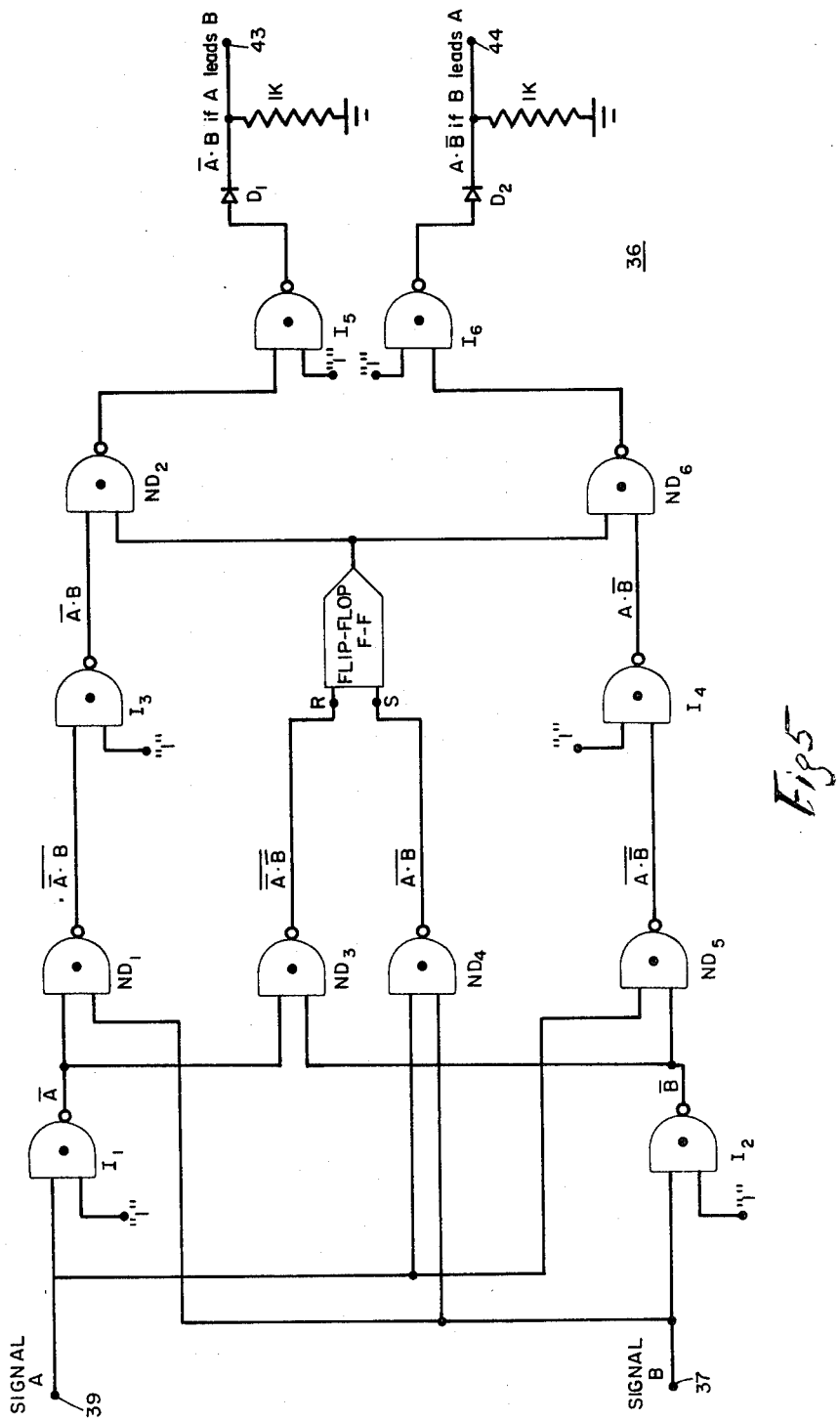

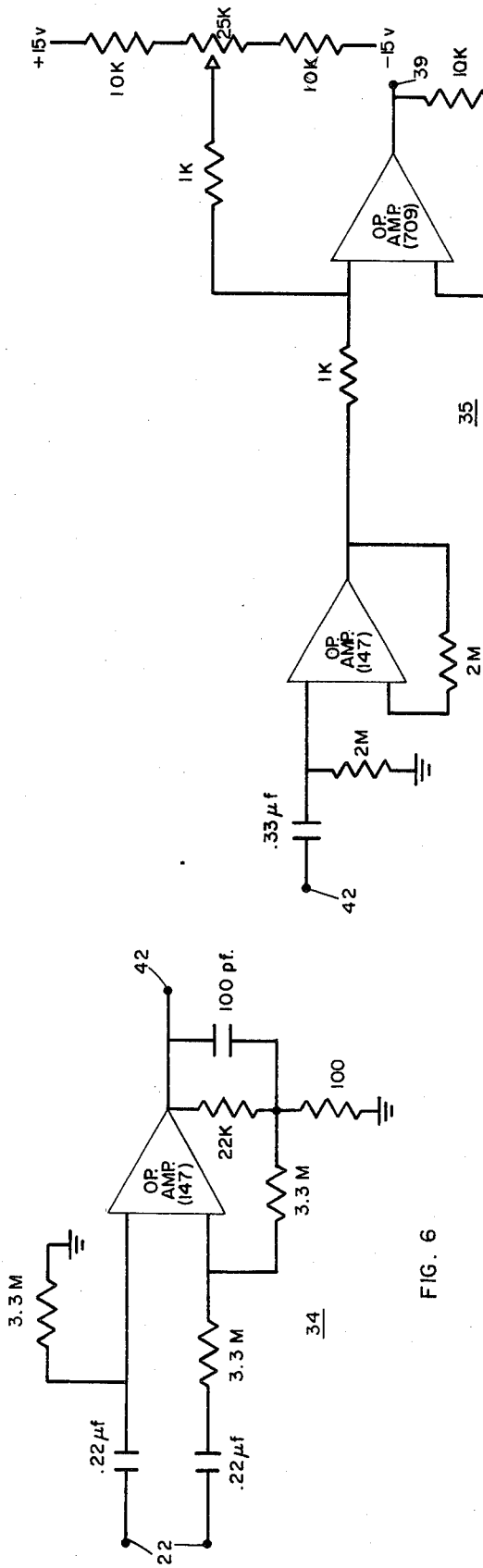
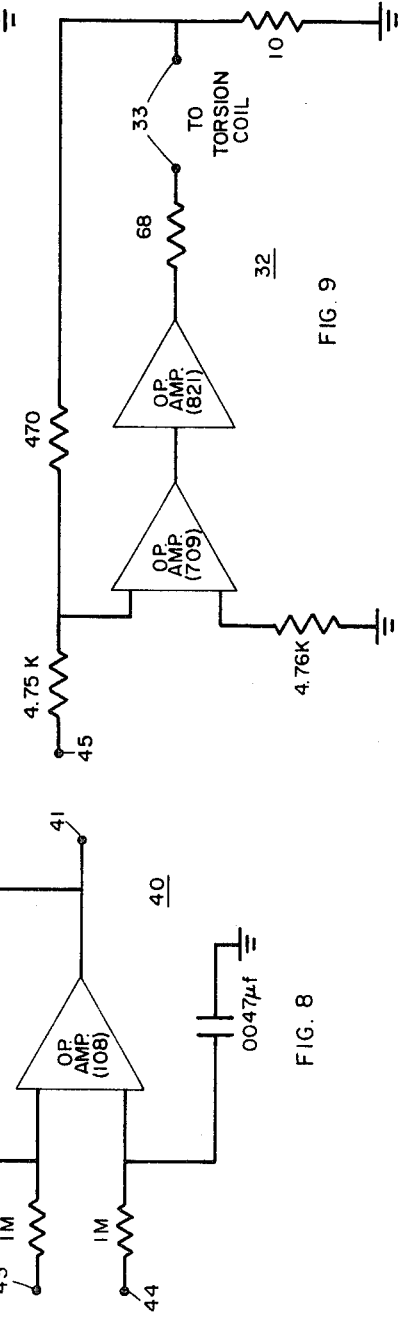

TORSIONAL VIBRATION DENSITOMETER

This invention relates to a fluid density measuring apparatus and in particular to a device whose frequency of resonance varies with the density of the fluid into which it is immersed. A measurement of the frequency provides the measure of density.

This invention was made in the course of work done under a contract Nonr 1841 (74) from the United States Navy.

Many techniques have been proposed and developed to make measurement of fluid density. Some techniques are direct and depend upon weighings of known volumes or the displacement caused by a reference volume of known density, and others are indirect and depend upon chemical techniques. Their precision and accuracy vary widely. However, they all suffer from the same difficulty of requiring a sample of fluid to be taken nd subjected to laboratory analysis. It is desirable to have equipment that is both sensitive to small changes in density and which provides a continuous indication of density in situ.

Therefore, a primary object of this invention is to provide apparatus capable of making a direct, precise and continuous in situ measurement of the density of a fluid. Such apparatus possesses strong potential for oceanographic applications as well as for a multitude of industrial and manufacturing processes where the measure of fluid density provides a feedback signal for control of automated sequences.

The objects, features and advantages of any invention will more readily be understood and appreciated from the following detailed description of a preferred embodiment thereof selected for purposes of illustration and shown in the accompanying drawing, in which:

FIG. 5 is a schematic of the phase comparator.

FIGS. 6, 7, 8, and 9 are circuit diagrams of the strain gage amplifier, the squaring amplifier, the up-down integrator and the current source, respectively.

DESCRIPTION OF THE INVENTION

Figure 1:
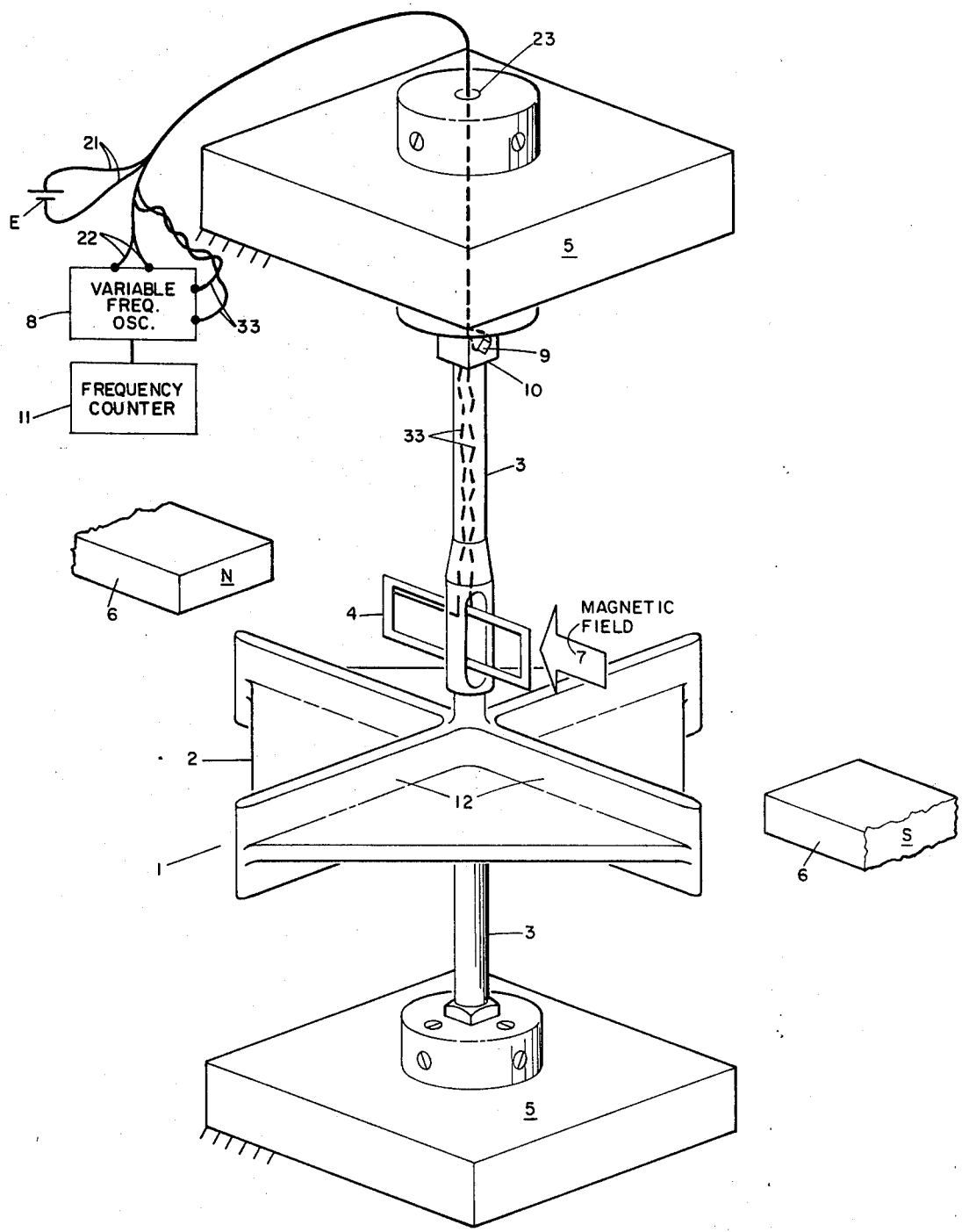
FIG. 1 is a pictorial view of the preferred embodiment of the invention.

The apparatus of the invention is shown in FIG. 1. Coupling to the fluid whose density is to be measured is provided by the transducer head 1. The transducer head 1 is a four-vaned stainless steel unit having a bisecting web 2 for rigidity. The head 1 is attached between the ends of two cylindrical torsion bars 3 which provide a torsional restoring force. Immediately above the head a coil 4 of fine magnet wire mounted in a longitudinal slot in bar 3 is wound so that its plane is parallel to the axis of the torsion bars 3. The entire head assembly is then mounted rigidly at the bar 3 ends to end plates 5 and positioned between the shaped pole pieces 6 of a magnet such that the plane of the coil 4 lies within and parallel to the magnetic field 7 of the magnet in a fashion similar to a galvanometer movement. A small current passed through the coil 4 at the torsional resonant frequency by variable frequency oscillator 8 provides the torque necessary to excite a periodic small amplitude angular displacement of the transducer head 1. The value of the resonant frequency depends in a simple way upon the stiffness of the torsion bars and the density of the fluid into which the head is immersed. A four-arm active strain gage bridge 9 mounted on one torsion bar at its base 10 senses the angular displacement and provides an electrical signal for feedback to oscillator 8 to sustain the oscillations. An accurate measurement of the oscillator frequency in frequency counter 11 is converted into an accurate measure of fluid density by calibration.

THE TRANSDUCER ASSEMBLY

The four-vaned head 1 forces into motion a small volume of fluid in its immediate vicinity. When in torsional vibration, each vane 12 resembles a dipole acoustic source. Its four vanes acting together in close proximity then approximate an octupole radiator of acoustic energy. The intensity in the radiation field decreases inversely as the ninth power of the distance from the head 1, making this design inefficient as an acoustic source. It is just this characteristic, however, that makes the design highly desirable as a density transducer. It ensures that the volume of fluid influenced by transducer motions is of the order of the dimensions of the head 1, and therefore ensures that the transducer responds only to changes in the local fluid density. Because the decay of field intensity with distance is caused by phase interference rather than by spherical spreading or absorption phenomena, the effects of small changes in acoustic parameters on the size of the virtual mass can be safely ignored. Comparisons of the resonant frequency in water with that in air have shown that the effective diameter of the virtual mass of fluid entrained is only 70 percent of the diameter of the transducer head itself.

Because the acceleration of every portion of the transducer head is sufficiently low, there is no danger of cavitation within the fluid.

The transducer head 1 comprising the axial vanes 12 and the transverse stiffening web 2 is machined from a solid block of No. 304 stainless steel for dimensional stability and for resistance to attack by sea water. The surface may be passivated to eliminate frequency drift if long exposure to corrosive environments is expected. Although stainless steel has a moderate thermal expansion coefficient, its effect on frequency is eliminated by properly choosing the thermoelastic coefficient for the torsion bars. The thickness of the vanes and web are designed so that flexure of the head itself at any point contributes less than 1 percent to the total displacement due to twisting of the torsion bars. Greater flexure would be permissible but would reduce the coupling to the fluid.

The torsion bars 3 are rigidly attached at their ends to the two end plates 5, and the torsion coil 4 is positioned between the shaped pole pieces 6 in the magnetic field 7 near the head 1 which connects bars 3. The framework supporting the end plates 5 is rigid so that there is negligible twisting in it when torque is applied to the bars 3 at the transducer head by coil 4. The head 1 is open to allow fluid to flush freely through the transducer head. This feature insures a rapid response to density changes in the surrounding fluid.

Although the preferred embodiment of the invention has employed a torsionally resonant transducer comprising a rod to which vanes are attached to provide a transducer of sufficiently high Q and sufficiently low inertia for desirable operation, it is apparent that other mechanically resonant transducer assemblies could be fabricated by those skilled in the art to provide the function of transducer of the preferred embodiment with the desired properties. As an example, a magnetostrictive or piezoelectric rod, of configuration such as that of the preferred embodiment, in longitudinal vibration instead of torsional and with a vane in a plane transverse to the axis of the rod would function adequately. A plurality of vanes spaced along the axis of the rod would appear to provide a localized field of influence as in the multi-vaned transducer of the preferred embodiment.

Another example of a suitable transducer would be one in which the rod is eliminated as the element providing the spring constant of the mechanically resonant system. Instead, a vane which provides the dual function of the spring constant together with coupling to the fluid might be used. The vane may be magnetostrictive or it may be mechanically secured to an electrical coil which when energized in the presence of a magnetic field as in the preferred embodiment causes the vane to vibrate at the frequency of energization.

It is apparent from the above two examples that alternative embodiments of the mechanical transducer are available to those skilled in the art without departing from the scope of the invention. What is desired is a mechanically resonant device capable of being coupled to a fluid, capable of being electrically driven at the resonant frequency and capable of having its strain provide an electrical signal.

STRAIN GAGE BRIDGE

Figure 2:
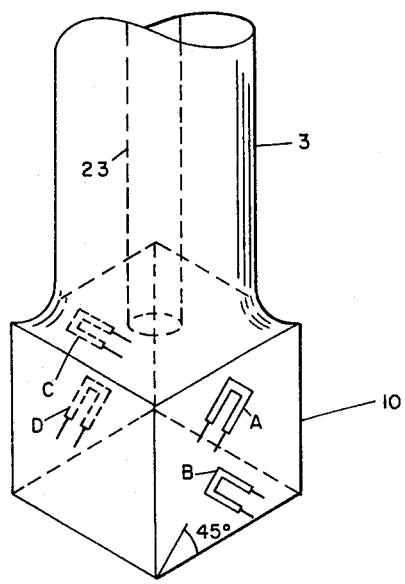
FIG. 2(a) shows the physical arrangement of the strain gage bridge and FIG. 2(b) shows the circuit connection of the strain gages.
Figure 2:
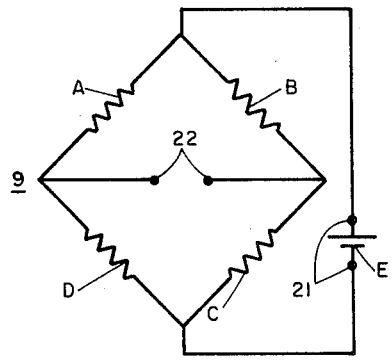

Angular displacement of the transducer head is sensed by a four-arm active semiconductor strain gage bridge 9 shown in FIG. 2. The gages A, B, C, and D are mounted on opposite faces of two flats at the base 10 of one of the torsion bars 3. Their orientation at 45° with respect to the torsion bar axis is shown on FIG. 2(a) and their electrical connection as in FIG. 2(b) give maximum sensitivity to torsional stresses and greatly attenate signals due to flexure of the bar. This bridge arrangement greatly reduces the possibility that flexural modes of oscillation will be excited. The wires 21, 22 connected to the bridge are conveniently brought out through radial holes (not shown) to the center of bar 3 and thence out through an axial hole 23. The wires 33 to coil 4 are also brought out through hole 23 so that they have negligible effect on the amount of inertia of the transducer assembly. Wires 21 are connected to a source of d.c. electrical energy E for the bridge, and wires 22 provide an output control signal from the bridge 9 to variable frequency oscillator 8.

Variable Frequency Oscillator

Figure 3:
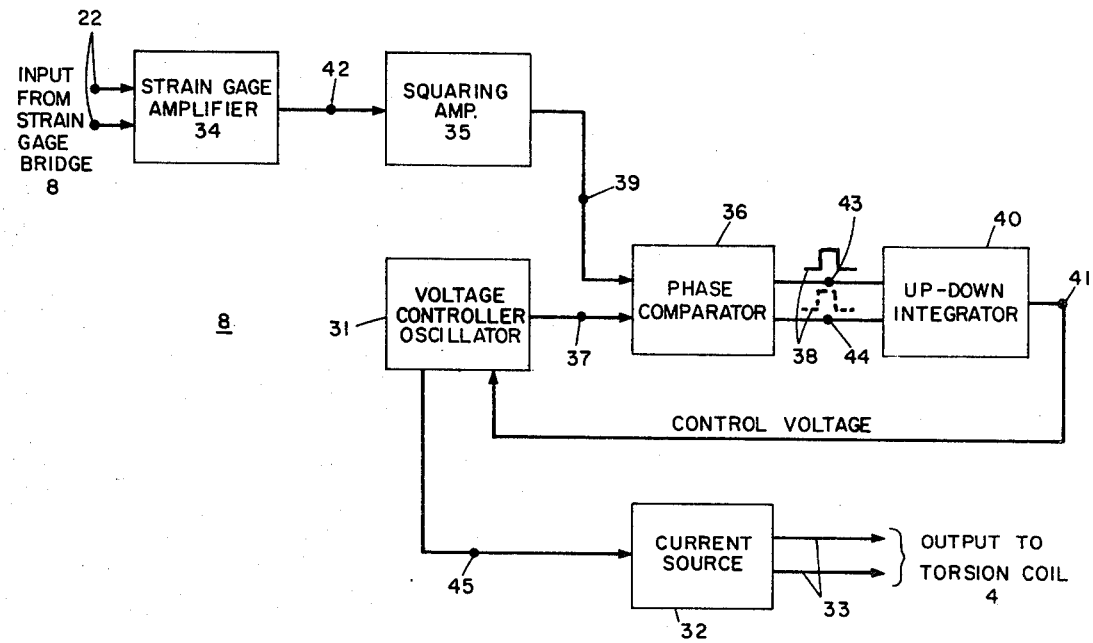
FIG. 3 is a block diagram of the variable frequency oscillator.

Resonance is sustained by feedback from bridge 9 to torsion coil 4 through variable frequency oscillator 8 as shown in the block diagram in FIG. 3. The sequence of events by which the resonant frequency is achieved occurs as follows. The voltage-controlled oscillator 31 begins at a frequency that is near to but not exactly at the resonant frequency. It provides a sawtooth signal on line 45 to the current source 32 which in turn provides a sawtooth current through lines 33 to the torsion coil 4. The torque produced by this current forces angular displacements of the transducer head 1. The strain gage bridge 9 provides a signal proportional to and in phase with the displacements.

After the bridge signal is amplified by the strain gage amplifier 34, it is converted to a square wave in circuit 35 and applied as one input 39 of the phase comparator 36. A square wave from the voltage controlled oscillator 31 shifted in phase 90° with respect to the sawtooth, is applied as the other input 37 of the phase comparator. Once each cycle of the square wave the phase comparator 36 generates a pulse 38 of constant amplitude whose width is proportional to the difference in phase between the two inputs 37, 39. If the phase is leading, the pulse 38 appears on the one line, and vice versa. The up-down integrator 40 is a standard difference integrator which accepts these pulses and adjusts its output level 41 accordingly so as to bring the voltage-controlled oscillator 31 to the exact resonant frequency.

This type of proportional control in the feedback loop produces a very tightly locked resonant system. Because a correction is applied once each cycle, any instantaneous error is reduced by averaging over a number of cycles. Having a local oscillator whose frequency need be adjusted only slightly has the added benefit of allowing the system to adjust rapidly to sudden changes in fluid density.

VOLTAGE CONTROLLED OSCILLATOR

Figure 4:
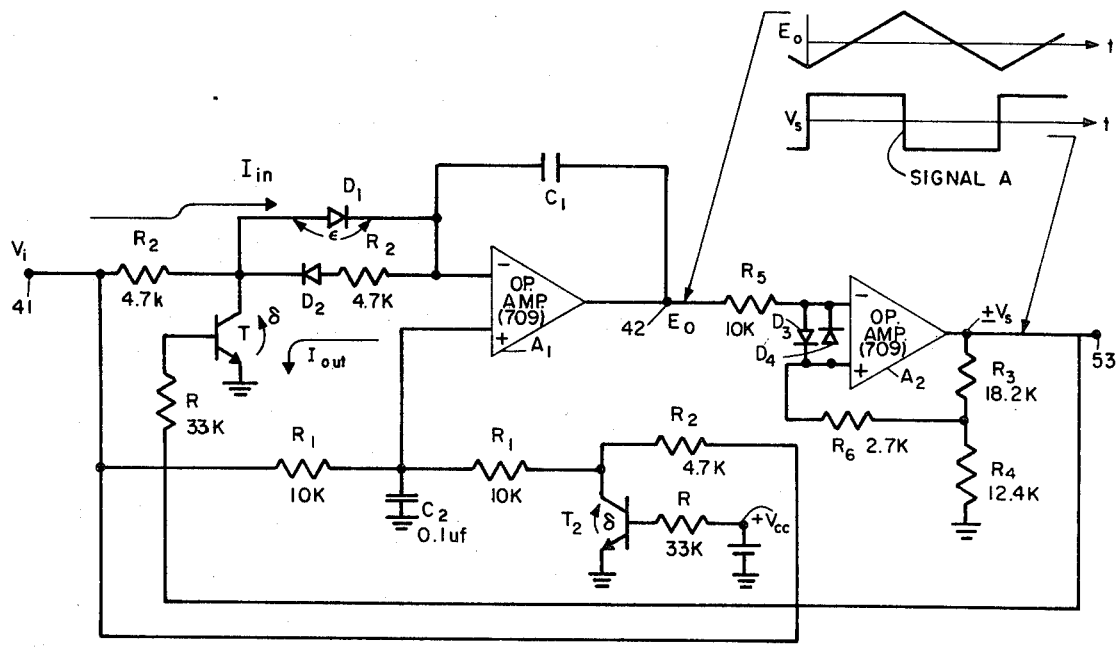
FIG. 4 is a schematic of the voltage controlled oscillator.

The voltage controlled oscillator 31 of FIG. 4 consists primarily of two operational amplifiers $A_1$, $A_2$, two identical switching transistors $T_1$, $T_2$, and two identical directing diodes $D_1$, $D_2$. Amplifier $A_1$ is connected as an integrator with feedback capacitor $C_1$ and input resistors $R_2$. Amplifier $A_2$ is connected as a voltage comparator with hysteresis. Diodes $D_3$ and $D_4$ protect $A_2$ from excessive input potential. Resistors $R_5$ and $R_6$ serve to balance the resistance at each input and to prevent common mode latch-up of the amplifier. Switching transistor $T_1$ allows the input current to $A_1$ to be periodically reversed. $T_2$, which is held in saturation by a constant potential $V_{cc}$, serves to compensate for the effect of collector-to-emitter saturation voltage of transistor $T_1$.

The voltage $E_o$ at the output 45 of $A_1$ is a triangular waveform. Its amplitude depends upon the output saturation voltage $\pm V_s$ of amplifier $A_2$ and upon the voltage divider ratio of resistors $R_3$ and $R_4$. The frequency is governed by the magnitude of the input voltage $V_i$, by the voltage divider ratio of $R_3$ and $R_4$, and by the $R_2C_1$ product associated with amplifier $A_1$.

The two resistors labelled $R_1$ act as a voltage divider for the input voltage $V_i$ in series with the collector-to-emitter saturation voltage $\delta$ of transistor $T_2$. Therefore, the voltage across $C_2$ is $$V_{c2} = (V_i + \delta)/2$$

The two diodes $D_1$ and $D_2$ direct the current flow into and out of amplifier $A_1$. Because they are identical units, they exhibit identical forward voltage drops $\epsilon$ under identical conditions.

The following events occur during one cycle of the voltage controlled oscillation. Suppose the output of comparator $A_2$ is at its negative saturation level $-V_s$. Transistor $T_1$ is off and $$I_{in} = (V_i - \epsilon - V_{c2})/R_2 = (V_i - \delta - 2)/2R_2,$$

$$I_{out} = 0.$$

The inflow of current $I_{in}$ through $R_2$ and $D_1$ causes a negative-going ramp $E_o$ to appear at the output of $A_1$. When this ramp reaches the potential $-V_s R_4/(R_3+R_4)$, the output of $A_2$ goes instantaneously to $+V_s$, causing $T_1$ to saturate. $I_{in}$ goes to zero and $I_{out}$ begins to flow through $R_2$, $D_2$, and $T_1$. Its magnitude is $$I_{out} = (V_{c2} - \delta - \epsilon)/R_2 = (V_i - \delta - 2\epsilon)/2R_2$$

This current causes a positive-going ramp to appear at the output of $A_1$. Because $I_{out} = I_{in}$, $dE_o/dt$ for the negative-going ramp equals $-dE_o/dt$ for the positive-going ramp. Therefore, $E_o$ is a triangular waveform. When $E_o$ reaches the potential $+V_s R_4/(R_3+R_4)$, the output of $A_2$ goes instantaneously to $-V_s$. This turns off transistor $T_1$, and the cycle begins again.

With $I_{in} = I_{out} = I$, the period T of oscillation can be written as $$\frac{T}{4} = \frac{C_1}{I}\left[V_s \frac{R_4}{R_3+R_4}\right].$$

The square wave output 53 of amplifier $A_2$ maintains a precise 90° phase lead over the triangular output 45 of amplifier $A_1$, regardless of frequency.

Although the voltage-controlled oscillator of the preferred embodiment has provided a sawtooth waveform at output 45, a conventional voltage controlled oscillator which provides a sine wave output would be as effective. It is within the capabilities of those skilled in the art to provide a conventional voltage controlled sinusoidal drive current together with the 90° phase shifted square wave output by circuitry other than that of the preferred embodiment.

PHASE COMPARATOR

The phase comparator of FIG. 5 consists of six two-input NAND gates ND, six inverting amplifiers I and a two input set-reset flip flop F—F. Input square waveforms A and B on lines 37, 39 are time sequences of logical ones and logical zeros having voltage levels appropriate for the logic gates used. Standard logic symbology is used in this discussion so that, for instance, $\bar{A}$ means the complement of A and $\overline{A \cdot B}$ means the complement of "A AND B."

The operation of the phase comparator depends upon the fact that the sequence of logical events generated from the two input signals A and B occur in one order if the phase of A leads that of B and in a different order if the phase of B leads that of A. Thus, when the phase of input A is leading the phase of input B, the sequence of logical events is $A \cdot B$, $\bar{A} \cdot B$, $\bar{A} \cdot \bar{B}$, $A \cdot \bar{B}$, $A \cdot B$, $\bar{A} \cdot B$, etc. in continuous repetition. When the input B leads A, the second and fourth logical events in the above sequence are interchanged so that the sequence becomes $A \cdot B$, $A \cdot \bar{B}$, $\bar{A} \cdot \bar{B}$, $\bar{A} \cdot B$, $A \cdot B$, $A \cdot \bar{B}$, etc. A cycle for the phase comparator begins with the logical event $A \cdot B$ and terminates with the logical event $\bar{A} \cdot \bar{B}$. During that interval of time only two other logical events may occur, the event $\bar{A} \cdot B$ if A leads B or the event $A \cdot \bar{B}$ if B leads A. The duration of the events $\bar{A} \cdot B$ or $A \cdot \bar{B}$ is a direct indication of the amount of phase difference between the two input signals. By suitably gating the signals, a logical one voltage level coincident with the event $\bar{A} \cdot B$ is made to appear at one of the output lines when A leads B and a similar voltage level coincident with the event $A \cdot \bar{B}$ is made to appear at the other output line if B leads A.

The phase comparison begins with the generation of the logic signal $\overline{A \cdot B}$ by NAND gate $ND_4$. (Refer to schematic diagram). This signal sets flip-flop F—F output to a "one" output state which in turn enables one input of $ND_2$ and $ND_6$. If signal A leads signal B, then the next event after $A \cdot B$ is the event $\bar{A} \cdot B$. The logic signal $\bar{A} \cdot B$, after being generated in complement form by $ND_1$, is passed through $I_3$, gated through $ND_2$ and presented at the output of $I_5$. Its duration is an indication of the amount that signal A leads signal B. Immediately after $\bar{A} \cdot B$, the signal $\bar{A} \cdot \bar{B}$ is generated in complement from by $ND_3$. This signal resets F—F which in turn disables NAND gates $ND_2$ and $ND_6$. Once these two gates have been disabled, the next event $A \cdot \bar{B}$, which would give an erroneous output, is blocked from reaching $I_6$.

If, however, signal B leads signal A, the event $A \cdot \bar{B}$ occurs after $A \cdot B$. Flip-flop F—F which is set again by the occurence of $A \cdot B$, enables $ND_2$ and $ND_6$. After being generated in complement form by $ND_5$, the logic signal $A \cdot \bar{B}$ is passed through $I_4$, gated through $ND_6$ and presented at the output of $I_6$. Its duration is an indication of the amount that signal B leads signal A. Immediately following $A \cdot \bar{B}$, the signal $\bar{A} \cdot \bar{B}$ is generated in complement form by $ND_4$ and is used to reset F—F. This disables $ND_2$ and $ND_6$ until the next occurrence of $A \cdot B$ and precludes any erroneous signal at $I_5$.

The output from either $I_5$ or $I_6$ is, therefore, a train of pulses whose width is proportional to the instantaneous phase difference between input signals A and B. If A leads B, the pulse train appears at $I_5$ output 51 and if B leads A, it appears at $I_6$ output 52. The pulse trains are in a form suitable for application to feedback elements for system control. The diodes $D_1$ and $D_2$ serve only to remove some small residual voltage that appears at the outputs of $I_5$ and $I_6$.

Phase error allowed by this type of phase comparator depends primarily upon small differences in the propagation delay time of the particular NAND gates used. This error is minimized, however, by complete component symmetry in the design.

ASSOCIATED CIRCUITRY

The circuit diagrams of the strain gage amplifier, squaring amplifier, the up-down integrator and the current source of FIGS. 6, 7, 8, and 9, respectively have been included for completeness of the circuitry comprising the variable frequency oscillator 8 of the preferred embodiment. Commercially available operational amplifiers OP. AMP. were used to perform the desired functions. Other circuits to provide these functions could be provided by those skilled in the art.

TORSIONAL OSCILLATIONS

When a mechanical system such as the one described having a transducer with moment of inertia I and torsion bars with spring constant k is excited by a sinusoidal torque of amplitude $\hat{\tau}$ and radian frequency $\omega$, its angular displacement $\theta$ is given by the differential equation, $$I\frac{d^2\theta}{dt^2}+\mu\frac{d\theta}{dt}+k\theta=\hat{\tau}e^{i\omega t} \quad (1)$$

where $t$ is time and $\mu$ is the damping coefficient. The complex amplitude $\theta(\omega)$ is found to be, $$\theta(\omega)=\hat{\tau}\frac{(k-I\omega^2)-i\mu\omega}{(k-I\omega^2)^2+(\mu\omega)^2} \quad (2)$$

If the frequency is adjusted so that the angular response lags the applied torque by 90°, then the real part of (2) must be zero, so that, $$\omega=(K/I)^{1/2}=\omega_r. \quad (3)$$

Equation (3) defines the resonant frequency. It should be noted that when torsional oscillations are sustained such that $\theta$ lags $\tau$ by 90°, the resonant frequency is not dependent upon $\mu$. This ensures that $\omega_r$ will not be a function of dissipation in the system. In terms of its electrical analog, $\omega_r$ is called the unity power factor frequency because at this frequency current and applied voltage are in phase.

When the transducer is placed into a fluid, its effective moment of inertia is increased because of the virtual mass of entrained fluid. The moment of inertia of the virtual mass is directly proportional to its density $\rho$. The system is sustained in resonance by automatically adjusting the driving frequency so as to maintain the 90° phase angle between torque and angular response. Sensing of an off-resonance error depends upon the fact that the phase angle between $\tau$ and $\theta(\omega)$ changes rapidly near $\omega_r$. The rate of change of the phase angle with frequency is directly proportional to the mechanical Q and inversely proportional to the resonant frequency. The mechanical Q of the system should be as high as possible for best results. The mechanical Q is directly proportional to the spring constant k of the torsion bars and inversely proportional to the products of the resonant frequency and the damping coefficient $\mu$ of the fluid.

When the system operates precisely at $\omega_r$, there is no change in the resonant frequency if $\mu$ changes. However, if the phase difference between torque and response is not quite 90°, there will be some error. The percent change in frequency compared to the percent change in $\mu$ decreases with increasing system Q. This is one advantage of making Q as large as possible.

Another advantage of a high Q system is that the amount of torque required to sustain an angular displacement $\theta$ at resonance is decreased in proportion to Q.

As an example of a Q value which is attainable, the preferred embodiment had a Q of 239 when the vanes were immersed in water at a resonant frequency of 477 Hz. The moment of inertia of the transducer assembly was approximately three fourths of the inertia when immersed in water. Consistent with the desire to have vanes with mechanical stiffness, to provide good coupling to the fluid the inertia of the transducer assembly should be as small as possible with respect to the inertia of the fluid entrained by the transducer head since sensitivity to changes in fluid density is thereby increased.

The torque is produced by the simple technique of current interaction with a magnetic field as is done in galvanometer movements. As shown in FIG. 1, a coil 4 is placed with its plane parallel to the magnetic field. When the mechanical system has a large Q, sufficient torque is provided by this technique to drive the system.

TEMPERATURE COMPENSATION

The thermoelastic coefficient as used here is defined as the change in elastic modulus without correction for the effects of thermal expansion. The moment of inertia I of the transducer head is proportional to its height h and the fourth power of its radius R. The expression for angular resonant frequency $\omega_r$ is proportional to the square root of the elastic modulus k divided by the moment of inertia I. When $\omega_r$ is differentiated with respect to temperature T, the resulting expression shows that the thermoelastic coefficient of the material for the torsion bar can be chosen such that it cancels the thermal expansion coefficient of the entire transducer assembly thus giving a near-zero overall sensitivity to temperature changes. Such a material is Ni-Span-C Alloy 902, a product of the International Nickel Company. With cold work and heat treatment, this alloy can be given a wide range of coefficients as shown in Technical Bulletin T-31, International Nickel Co., Inc., 1963.

OTHER FORMS OF RESONANCE

Although the preferred embodiment of the invention has used a resonance defined as that frequency at which the phase angle between the applied torque and the resulting angular displacement is 90°, there are other resonances which could also be utilized. The resonance defined by the 90° phase relationship referred to above has the advantage over the two resonances to be now discussed in that the frequency of resonance is independent of linear damping effects of the fluid.

Another form of resonance which could be used in this invention is one where the frequency is adjusted to produce the maximum displacement of the mechanically resonant fluid coupled system. This form of resonance is sensitive to changes in the fluid viscosity so that apparatus would have to be calibrated for the viscosity of the fluid whose density is being determined. The strain gage output of the device described in the preferred embodiment would produce a signal to a voltage controlled oscillator in a feedback loop such that the frequency of oscillation would maximize the strain gage output signal. Although there may be applications where this type of resonance would be applicable, it is believed that apparatus incorporating amplitude resonance would not be as sensitive to density changes as that of the preferred embodiment.

An alternative form of resonance also responsive to fluid viscosity as well as density is that of the natural vibration frequency. The torsion bar of the preferred embodiment is caused to undergo an initial physical displacement from its quiescent position. The initial displacement of the bar may be produced by applying a current to coil 4. Upon its release from its displaced position, the bar and its attached vanes will experience a damped oscillation whose frequency may be determined. The output of the strain gage could be used to provide the damped oscillation frequency. Frequency locking techniques, well known to those skilled in the art, may be employed to extend the effective time duration of the frequency of the decaying oscillation for convenience of measurement. This type of resonance also produces a frequency which is sensitive to both density and viscosity of the fluid being measured and thus the viscosity of the fluid is required for accurate density measurements.

It will thus be seen that the objects set forth above, among those apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for determining the density of a fluid comprising:
   a mechanically oscillatory member,
   means for coupling said fluid to said member,
   means for causing said member to oscillate at its resonant frequency comprising,
   a voltage controllable electrical oscillator,
   means for applying a sinusoidal torque to said mechanical member,
   means for providing a first alternating electrical signal which is in phase with the applied torque,
   means for sensing a second alternating electrical signal which is in phase with the strain of the mechanical member,
   means for comparing the phase of said first and second electrical signals to provide a control electrical signal responsive to the phase difference,
   and means for providing said control signal to said electrical oscillator to control its frequency to maintain the compared phase difference at 90°,
   means for measuring the frequency of said electrical oscillator whereby the density of the fluid is determined.

2. The apparatus of claim 1 wherein said mechanically oscillatory member comprises a rod rigidly attached to a frame at least at one end, said rod being free to undergo torsional oscillation, and said fluid coupling means comprises at least one radially projecting vane attached to said rod other than at said frame.

3. The apparatus of claim 2 wherein there are a plurality of said vanes attached to said rod at the same longitudinal position and spaced equally in angle around the circumference of said rod.

4. The apparatus of claim 3 wherein the plane of said vanes is axially and radially oriented with respect to the axis of said rod.

5. The apparatus of claim 4 comprising in addition
   said rod being rigidly attached at both ends to said frame,
   and said vanes are attached centrally along the length of said rod.

6. The apparatus of claim 3 wherein said plurality of vanes are of open configuration to allow free flow of fluid to said vanes.

7. The apparatus of claim 5 wherein said plurality of vanes numbers four.

8. The apparatus of claim 2 wherein said means for causing said rod to torsionally oscillate at the resonant frequency comprises
   a coil attached to said rod,
   a magnet providing a magnetic field for said coil,
   the plane of said coil being in the direction of said magnetic field and along the axis of said rod,
   means for providing an alternating current to said coil at the frequency of resonance.

9. The apparatus of claim 8 wherein said means for providing an alternating current in said coil at the frequency of resonance comprises
   a voltage-controlled oscillation means connected to said coil to provide said alternating current,
   a strain sensing means attached to said rod to provide an alternating current signal responsive to the strain of said rod,
   a phase comparison means connected to said coil and said sensing means for determining the phase difference between the alternating current of said coil and the voltage of said strain sensing means and for providing an electrical output
   to said voltage controlled oscillator to control its frequency to cause said measured phase difference to be 90°.

* * * * *